United States Patent
Doloresco et al.

(10) Patent No.: US 6,899,526 B2
(45) Date of Patent: May 31, 2005

(54) COUNTERSTAGGER COMPRESSOR AIRFOIL

(75) Inventors: Bryan Keith Doloresco, Cincinnati, OH (US); Peter John Wood, Loveland, OH (US)

(73) Assignee: General Electric Company, Schenectady, NY (US)

( * ) Notice: Subject to any disclaimer, the term of this patent is extended or adjusted under 35 U.S.C. 154(b) by 45 days.

(21) Appl. No.: 10/634,545

(22) Filed: Aug. 5, 2003

(65) Prior Publication Data

US 2005/0031454 A1 Feb. 10, 2005

(51) Int. Cl.$^7$ ................................................. F01D 5/14
(52) U.S. Cl. ............. 416/238; 416/223 A; 416/DIG. 2; 416/242; 416/243
(58) Field of Search ........................... 416/238, 223 A, 416/DIG. 2, DIG. 5, 242, 243

(56) References Cited

U.S. PATENT DOCUMENTS

| | | | |
|---|---|---|---|
| 2,415,847 A | 2/1947 | Redding | |
| 4,585,395 A | 4/1986 | Nourse et al. | |
| 4,682,935 A | 7/1987 | Martin | |
| 5,088,892 A | 2/1992 | Weingold et al. | |
| 5,167,489 A | 12/1992 | Wadia et al. | |
| 5,249,922 A | 10/1993 | Sato et al. | |
| 5,397,215 A | 3/1995 | Spear et al. | |
| 5,642,985 A | * 7/1997 | Spear et al. | ................. 416/238 |
| 6,071,077 A | 6/2000 | Rowlands | |
| 6,079,948 A | 6/2000 | Sasaki et al. | |
| 6,290,465 B1 | * 9/2001 | Lammas et al. | ............. 416/238 |
| 6,299,412 B1 | 10/2001 | Wood et al. | |
| 6,331,100 B1 | 12/2001 | Liu et al. | |

OTHER PUBLICATIONS

Smith et al, "Sweep and Dihedral Effects in Axial–Flow Turbomachinery," ASME 62–WA–102, 1962, pp: 1–14.

* cited by examiner

Primary Examiner—Edward K. Look
Assistant Examiner—Richard A Edgar
(74) Attorney, Agent, or Firm—William S. Andes; Francis L. Conte

(57) ABSTRACT

A compressor airfoil includes opposite pressure and suction sides joined together at leading and trailing edges and extending in span between a root and tip. The airfoil includes stagger increasing above the root and decreasing above a midspan pitch section thereof.

20 Claims, 4 Drawing Sheets

COUNTERSTAGGER COMPRESSOR AIRFOIL

BACKGROUND OF THE INVENTION

The present invention relates generally to gas turbine engines, and, more specifically, to compressors therein.

In a gas turbine engine air is pressurized in a compressor and mixed with fuel in a combustor for generating hot combustion gases. The combustion gases are discharged through turbine stages which extract energy therefrom for powering the compressor, and producing output power for use in driving a fan in an exemplary turbofan aircraft engine application.

A multistage axial compressor includes cooperating rows of stator vanes and rotor blades which decrease in size to pressurize air in stages. The compressor vanes and blades have corresponding airfoils which typically vary in configuration as their size decreases from stage to stage for maximizing performance of the compressor. Compressor performance includes, for example, efficiency of compression, flow capability, and stall margin, which are all affected by the configuration of the vanes and blades.

More specifically, the flow or pressure distribution of the air as it is being compressed through the stator vanes and rotor blades is a complex three dimensional flow field varying circumferentially around the compressor, radially along the span of the vane and blade airfoils, and axially along the circumferentially opposite pressure and suction sides of the airfoils The airfoil pressure side is a generally concave surface cooperating with the opposite suction side, which is a generally convex surface, for efficiently pressurizing the air as it flows between blades in the axial downstream direction between the leading and trailing edges thereof. The pressure distribution of the air undergoing compression varies from the radially inner root of the airfoil to the radially outer tip of the airfoil which is spaced closely adjacent to a surrounding compressor casing to provide a suitable radial gap or clearance therewith.

The airfoil, itself, may be supported from the compressor rotor in any suitable manner such as being formed integrally therewith in a unitary blisk configuration, or each rotor airfoil may have an integral platform and dovetail for mounting the compressor blade in a corresponding dovetail slot formed in the perimeter of the compressor rotor.

A significant feature affecting compressor performance is the radial clearance provided between the airfoil tips and surrounding casing. The clearance should be as small as possible to minimize undesirable flow losses therethrough, but must be sufficiently large for accommodating transient operation of the compressor which may occasionally lead to tip rubs. In a tip rub, material is removed from the airfoil tip and may accumulate on the inner surface of the casing. The shortened tip increases the clearance with the casing which decreases compressor performance, which is further affected by any accumulation of rub material on the casing which disrupts the smooth flow of air therealong.

Nevertheless, commercial experience of multistage axial compressors in aircraft turbofan engines confirms long useful lives for the compressor rotor blades and continued high performance of the compressor. However, the occasional compressor blade tip rubs increase tip clearances and decrease compressor performance over the useful blade lifetime. The loss in compressor performance due to tip rubs further reduces performance of the engine since the pressurized air is used in the combustion process, and energy is extracted from the combustion gases in the turbines.

Accordingly, it is desired to provide a compressor rotor airfoil having improved aerodynamic efficiency notwithstanding increased blade tip clearances due to tip rubs.

BRIEF DESCRIPTION OF THE INVENTION

A compressor airfoil includes opposite pressure and suction sides joined together at leading and trailing edges and extending in span between a root and tip. The airfoil includes stagger increasing above the root and decreasing above a midspan pitch section thereof.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which.

DETAILED DESCRIPTION OF THE INVENTION

Figure 1:
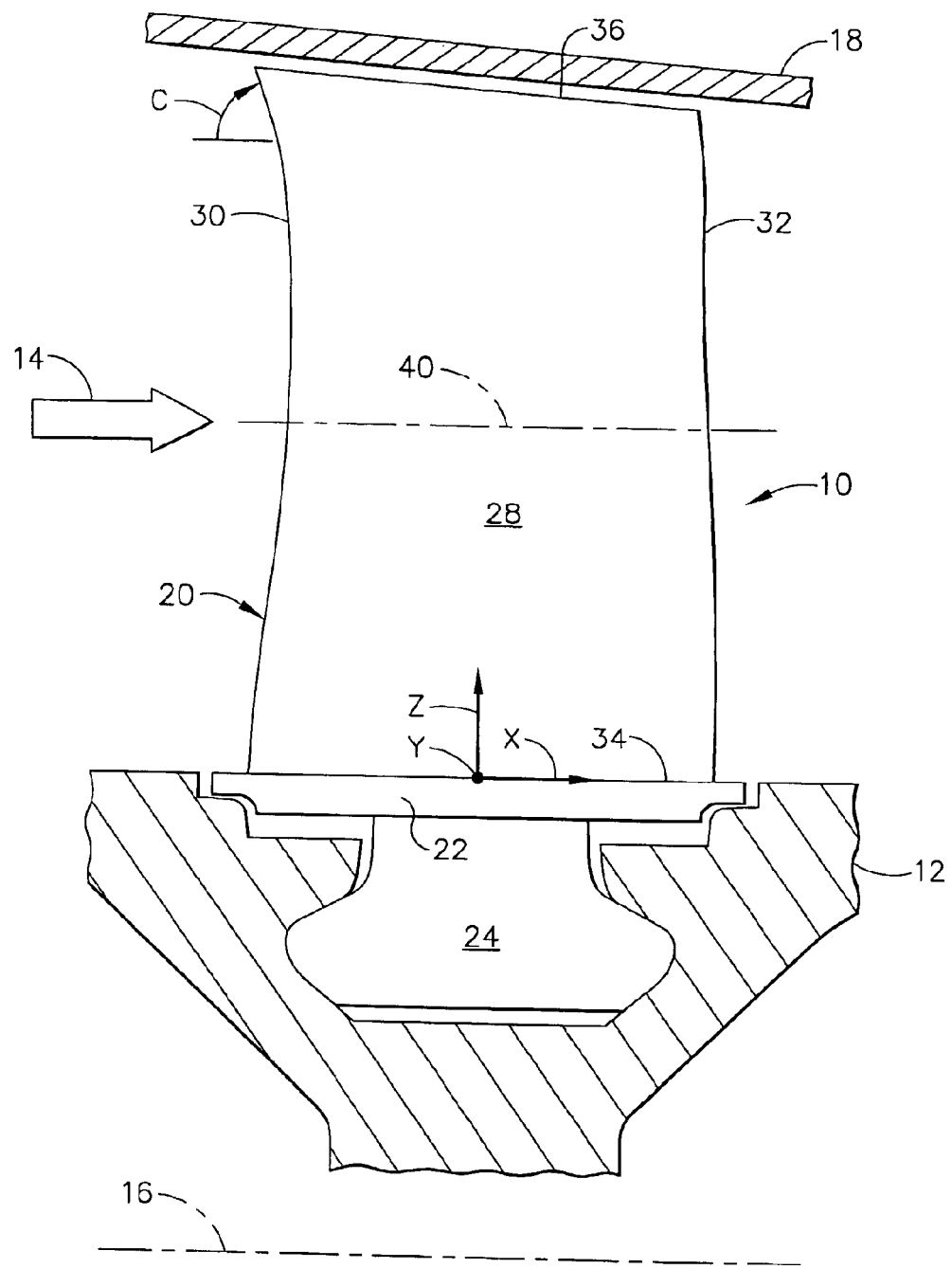
FIG. 1 is a partly sectional, axial projection side view of a row of compressor rotor airfoils in a multistage axial compressor.

Illustrated in FIG. 1 is a row of compressor rotor blades 10 suitably mounted to a compressor rotor 12 of a multistage axial compressor in a gas turbine engine, shown in part. The compressor has several stages of stator vanes (not shown) cooperating with corresponding compressor blades which decrease in size in the downstream direction as air 14 is compressed during operation. The rotor 12 is axisymmetrical around the axial centerline axis 16 of the engine and supports a full row of the blades 10 within an annular outer casing 18.

Each compressor rotor blade 10 includes an airfoil 20 extending in span along a radial axis Z between the perimeter of the rotor and the inner surface of the casing 18. The airfoil may be integrally formed with the rotor 12 in a blisk configuration (not shown), or may be removably joined thereto in a conventional manner.

For example, each airfoil may include an integral platform 22 which defines the inner boundary for the air being compressed. An integral dovetail 24 extends from the platform in a unitary configuration with the blade for being mounted in a complementary dovetail slot in the perimeter of the rotor. In the exemplary embodiment illustrated in FIG. 1, the dovetail 24 is a circumferential entry dovetail suitably mounted in the perimeter of the rotor.

Figure 2:
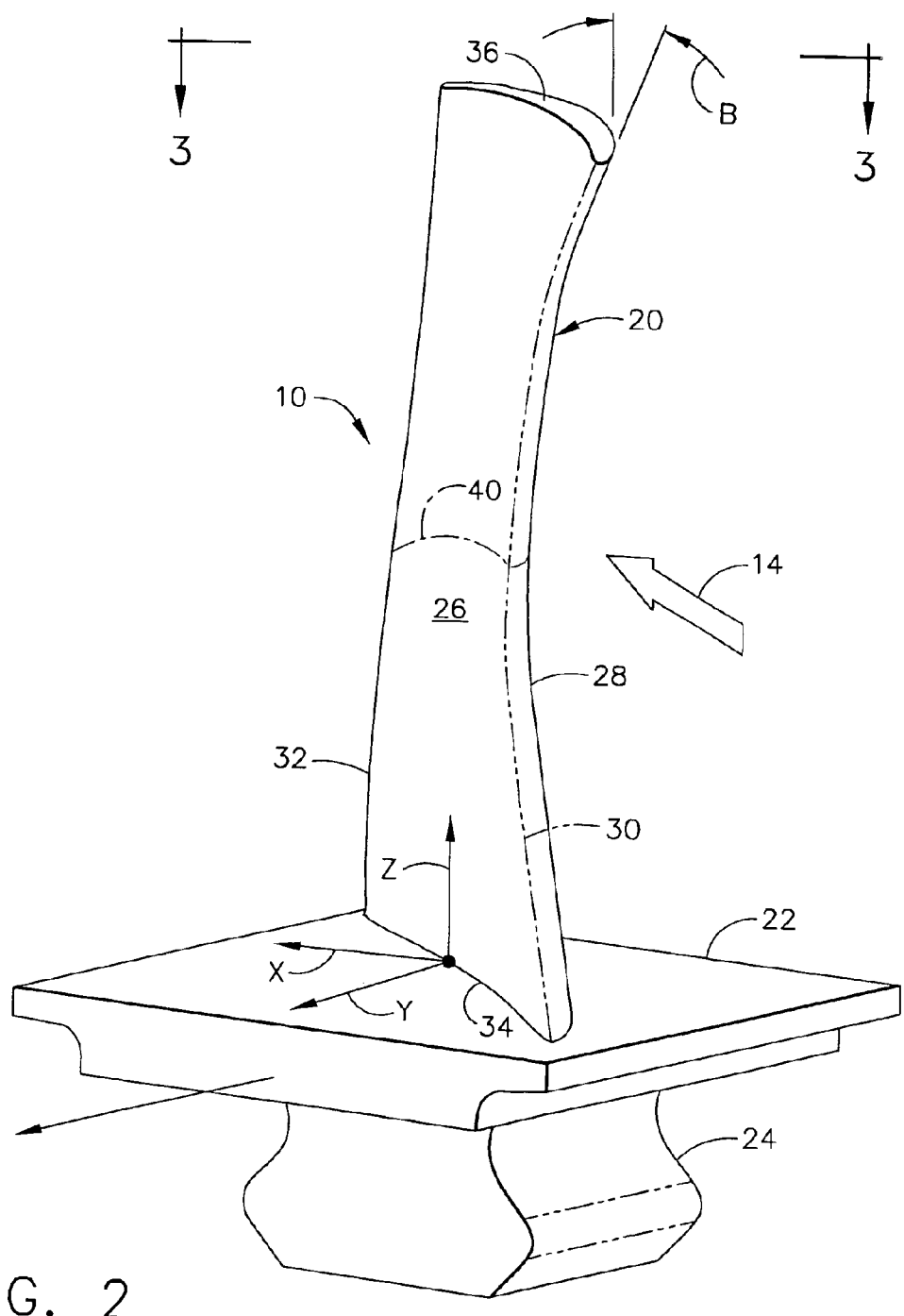
FIG. 2 is a isometric view of an exemplary one of the compressor rotor blades illustrated in FIG. 1 in isolation.

The compressor airfoil 20 is illustrated in a preferred embodiment in FIGS. 1 and 2 and includes circumferentially or laterally opposite pressure and suction sides 26,28. The airfoil pressure side is generally concave and precedes the generally convex suction side as the airfoil rotates in the circumferential direction, represented by the Y axis, atop the rotor. The axial axis X is parallel with the engine centerline axis and represents the generally downstream direction of the air 14 as it undergoes compression through the multiple stages of the compressor.

The corresponding surfaces of the pressure and suction sides are joined together at axially or chordally opposite leading and trailing edges 30,32 and extend in radial span from a radially inner root 34 at the junction with the platform to a radially outer tip 36.

As shown in FIG. 1, the airfoil tip 36 is disposed closely adjacent to the inner surface of the surrounding casing 18 and defines a substantially constant radial clearance or gap therebetween extending between the leading and trailing edges of the airfoil. The generally concave configuration of the airfoil pressure side 26, and the generally convex configuration of the airfoil suction side 28 are conventionally defined for pressurizing the air 14 as it flows downstream between the compressor rotor blades 10 in each stage of the compressor.

The three-dimensional configuration of the airfoil may be defined in accordance with conventional practice to maximize aerodynamic performance of the compressor including efficiency, flow, and stall margin. And, the configuration of the airfoil is also designed for minimizing centrifugal stresses created therein during rotary operation of the blades in the compressor.

For example, conventional compressor rotor blades are designed with varying twist or stagger from root to tip thereof. The various radial sections of the airfoil have centers of gravity stacked along a suitable radial stacking axis which may be straight or bowed for effecting reduced centrifugal stress during operation. The surfaces of the airfoil are disposed relative to the incident air 14 being pressurized with suitable values of aerodynamic sweep which varies between the leading and trailing edges and root to tip of the airfoil.

As indicated above, the occasional rubbing of the airfoil tip 36 with the casing 18 may increase the radial clearance therebetween and decrease compressor performance for conventional compressor rotor blades. In order to reduce the sensitivity of the compressor airfoil illustrated in FIGS. 1 and 2 to increased clearance due to tip rubs, and for improving compressor performance, the airfoil 20 is suitably modified as described hereinbelow.

Figure 3:
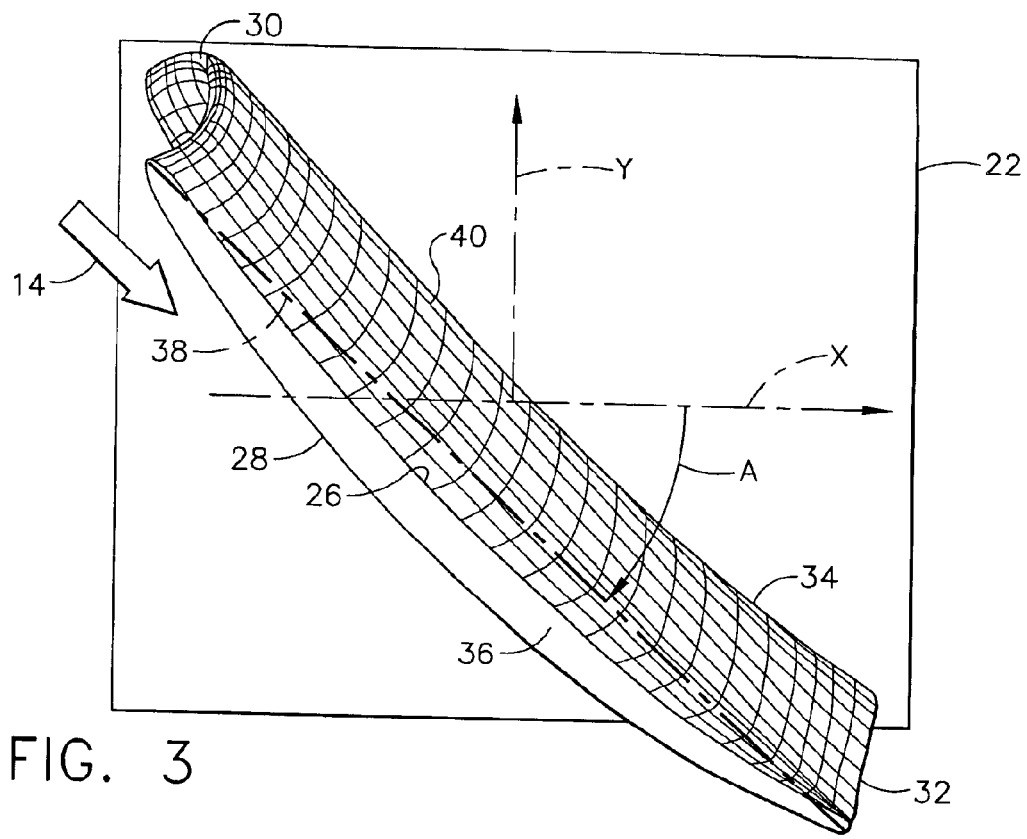
FIG. 3 is a top radial view of the compressor airfoil illustrated in FIG. 2 and taken generally along line 3—3.

For example, FIG. 3 illustrates a top view of the airfoil illustrated in FIG. 2 with a superimposed rectangular grid over the pressure and suction sides thereof. Each radial section of the airfoil includes a straight chord 38 extending from the leading edge to the trailing edge thereof which defines with the axial axis X a twist or stagger angle A. The stagger angle A is plotted in FIG. 4 in accordance with an exemplary embodiment varying in degrees from the root at zero span to the normalized tip at unity (1.0).

A significant feature of the compressor airfoil illustrated in FIGS. 1–3 is the introduction of bowed- or counterstagger along the span thereof. Preferably, the stagger increases above the root 34, and decreases above a midspan pitch section 40.

In a conventional compressor rotor airfoil, the stagger angle typically increases from root to tip of the blade. The desired stagger angle is primarily controlled by the desired pressure distribution in the air being pressurized which varies from root to tip of the airfoil.

In contrast, the stagger angle of the airfoil illustrated in FIGS. 2 and 3 increases in magnitude from a minimum value at the root 34 to a larger value at the pitch section 40, and decreases in magnitude above the pitch section toward the root stagger magnitude.

Figure 4:
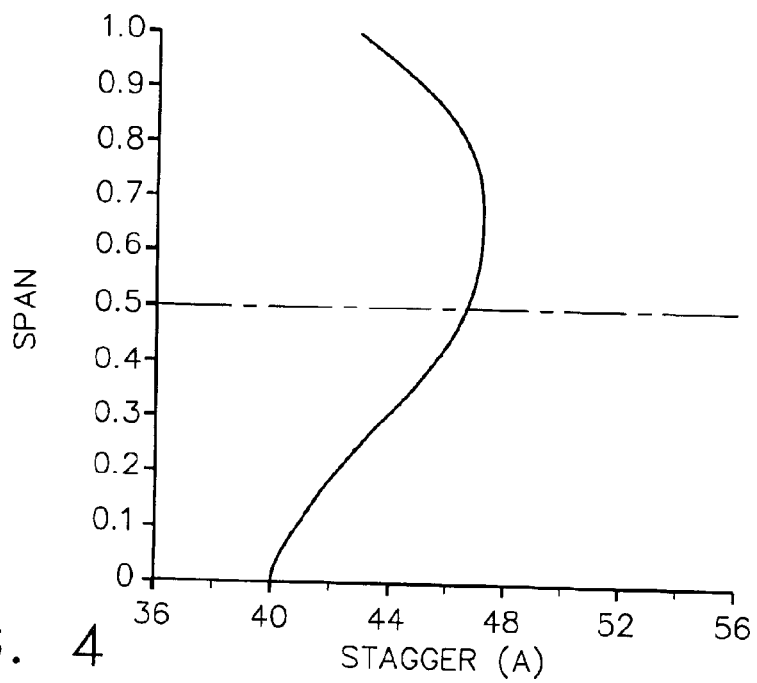
FIG. 4 is a graph plotting stagger in degrees over the radial span of the airfoil illustrated in FIGS. 1–3 in an exemplary embodiment.

In the exemplary graph illustrated in FIG. 4, the stagger angle has a minimum value of 40 degrees at the airfoil root and increases to a maximum value of about 47 degrees above the pitch section. From its maximum value the stagger angle decreases to the airfoil tip which has a stagger angle of 43 degrees which is slightly greater than the stagger angle at the root. The maximum stagger angle is preferably located above the midspan pitch section of the airfoil to promote the desired pressure distribution over the airfoil span. In the exemplary embodiment illustrated in FIG. 4, the maximum stagger value is located in the range of about 60%–85% span from the airfoil root.

The introduction of the reverse or counterstagger in the compressor airfoil above its pitch section results in the distinctive configuration of the airfoil illustrated in FIGS. 2 and 3. The counterstagger in the outer span of the airfoil substantially reduces the blade tip stagger over that found in conventional compressor airfoils for significantly reducing clearance sensitivity due to tip rubs as confirmed by three-dimensional computational fluid dynamic analyses. Rotor blade aerodynamic efficiency is improved at nominal clearance levels, and is significantly improved at deteriorated clearance levels following tip rubs. Analyses also confirm improved flow pumping with the deteriorated tip clearances. And, improvement in stall margin may also be possible.

The counterstagger is introduced or manifested in the airfoil illustrated in FIGS. 2 and 3 primarily along the leading edge 30 relative to the trailing edge 32. The trailing edge is generally straight from root to tip, whereas the leading edge 30 includes a distinctive concave bow along the radial span of the suction side 28, with the root and tip following in movement the pitch section 40 of the airfoil as it rotates in the tangential or circumferential Y direction illustrated in FIG. 3.

The introduction of reduced or lower blade tip stagger in the compressor airfoil illustrated in FIGS. 2 and 3 facilitates the introduction of increased tip leading edge dihedral. Tip dihedral is identified in FIG. 2 as the angle B between the local surface of the airfoil and the surrounding casing 18 illustrated in FIG. 1. Tip dihedral is a conventional parameter, with zero tip dihedral resulting in a blade tip which is oriented normal or perpendicular to the casing. Positive tip dihedral is achieved when the pressure or concave side, or both, of the blade tip forms an acute angle with the surrounding casing.

Figure 5:
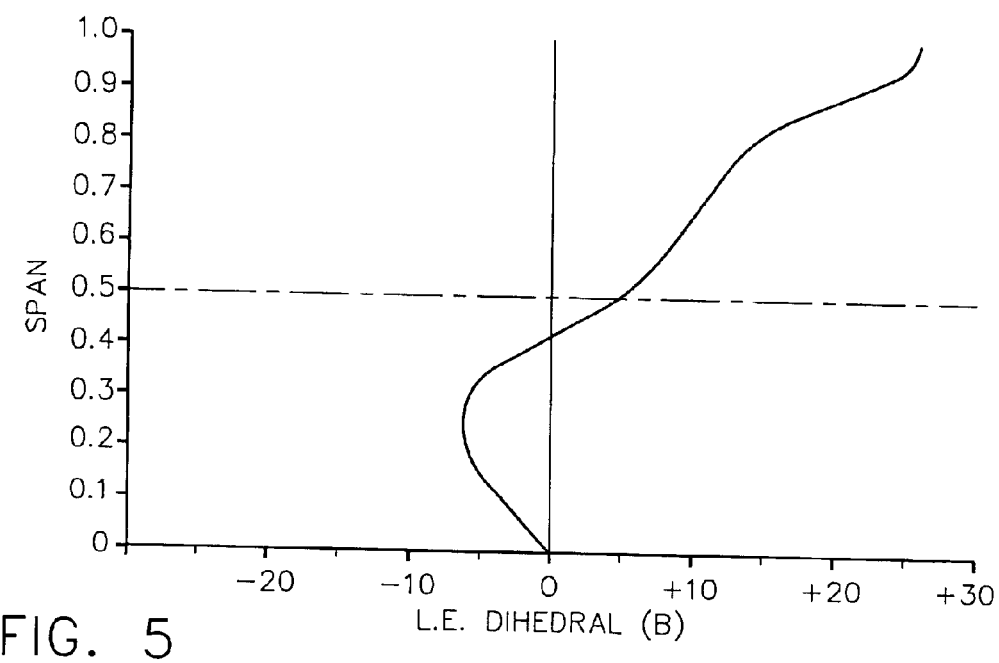
FIG. 5 is a graph plotting dihedral angle in degrees along the leading edge over the radial span of the airfoil illustrated in FIGS. 1–3 in an exemplary embodiment.

FIG. 5 is a graph of an exemplary profile of the dihedral angle B along the leading edge of the airfoil illustrated in FIGS. 1–3 relative to the surrounding casing in which the dihedral angle increases above the pitch section to a maximum value at the airfoil tip 36.

As shown in FIG. 5, the dihedral angle above the pitch section is positive and opposite to the dihedral angle between the root and pitch sections which is primarily negative. Preferably, the dihedral angle along the airfoil leading edge 30 at the tip 36 is greater in magnitude than below the pitch section 40. In the exemplary embodiment illustrated in FIG. 5, the dihedral angle varies from zero at the airfoil root to a maximum negative value of about −7 degrees at about 25% span returning to a zero value below the pitch section at about 40% span, and then increasing in magnitude to a maximum positive value of about 25 degrees at the airfoil tip at 100% span.

The dihedral angle B cooperates with the stagger angle A, both of which vary along the airfoil leading edge 30 to bow the airfoil leading edge concave in span along the suction side 28. The cooperation of the dihedral and stagger permit desirable positive dihedral along the airfoil tip with a maximum value at the airfoil leading edge, and relatively small but still positive magnitude of dihedral at the airfoil trailing edge. Correspondingly, a negative value of dihedral is provided immediately above the airfoil root, and along with the counterstagger in the airfoil effects the distinctive counter bowed leading edge illustrated in FIGS. 2 and 3.

FIGS. 3 and 5 illustrate a preferred configuration of the dihedral angle being unidirectional with the same positive magnitude along the airfoil tip 36 from the leading edge 30 to the trailing edge 32. In this way, undesirable negative dihedral is not found at the airfoil tip for improving aerodynamic performance thereof, including performance following occasional tip rubs.

The compressor airfoil illustrated in FIG. 1 also includes aerodynamic sweep C which is a conventional term of art. The counterstagger and tip dihedral permit a new introduction of forward or negative aerodynamic sweep at both the leading and trailing edges 30,32 of the airfoil tip 36 for further improving aerodynamic performance of the compressor airfoil.

Figure 6:
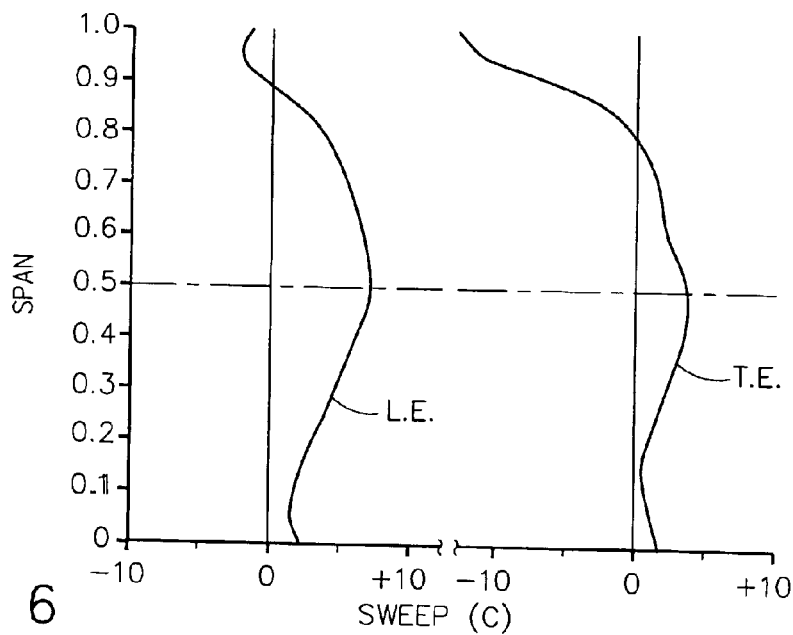
FIG. 6 is a graph plotting aerodynamic sweep angle in degrees along the leading and trailing edges over the radial span of the airfoil illustrated in FIGS. 1–3 in an exemplary embodiment.

FIG. 6 is an exemplary graph of the aerodynamic sweep angle C in degrees for the leading and trailing edges 30,32 of the airfoil illustrated in FIG. 1 along the radial span thereof. Negative or forward aerodynamic sweep is introduced at the airfoil tip along both the leading and trailing edges, with the sweep having a larger magnitude at the trailing edge. And, aft or positive aerodynamic sweep is introduced in the airfoil from the root 34 to the pitch section 40, and further radially outwardly to just below the airfoil tip along both the leading and trailing edges. Along the leading edge 30, the sweep transitions from positive to negative at about 90% span, and along the trailing edge, the sweep transitions from positive to negative at about 80% span.

FIG. 1 illustrates an axial projection view, or meridional view of the airfoil. The airfoil is shown with a concave axial projection along the leading edge 30, with the root 34 and tip 36 extending forward of the pitch section 40 along the leading edge. In this axially bowed or concave leading edge projection, the airfoil outer span is axially forward of the midspan region and permits the introduction of the aerodynamically favorable forward blade tip sweep at both the leading and trailing edges. Furthermore, the axially forward airfoil tip section permits the trailing edge dihedral at the tip to maintain a favorable positive value, and thusly avoiding undesirable negative dihedral along the airfoil tip.

As indicated above, compressor rotor airfoils are complex and sophisticated three-dimensional elements typically designed with various compromises for the competing demands of aerodynamic performance and mechanical strength. Stagger, dihedral, and aerodynamic sweep are all conventional features used in designing modern compressor rotor blades as indicated by the exemplary references of record, incorporated herein by reference.

However, the exemplary compressor rotor blade illustrated in FIGS. 1–3 includes distinct configurations of stagger, dihedral, and aerodynamic sweep which are used to advantage in a cooperation for enhancing compressor performance not only with a nominal clearance with the compressor casing, but after increased clearance following occasional tip rubs in extended use of the blade in a gas turbine engine.

The introduction of specific forms of stagger, dihedral, and aerodynamic sweep at the compressor blade tip illustrated in the figures is blended with the stagger, dihedral, and sweep in the inner span portion of the airfoil resulting in a distinctive overall configuration and corresponding performance enhancement.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims in which we claim:

1. A compressor airfoil for pressurizing air inside a surrounding casing, said airfoil comprising:
   laterally opposite pressure and suction sides joined together at chordally opposite leading and trailing edges and extending in span from a root to a tip;
   stagger increasing above said root, and decreasing above a midspan pitch section of said airfoil; and
   a dihedral angle relative to said casing increasing above said pitch section to said tip.

2. An airfoil according to claim 1 further comprising a concave axial projection along said leading edge, with said root and tip extending forward of said pitch section along said leading edge.

3. An airfoil according to claim 2 wherein said stagger increases in magnitude from said root to said pitch section, and decreases in magnitude above said pitch section toward said root stagger magnitude.

4. An airfoil according to claim 3 wherein said dihedral angle above said pitch section is opposite to said dihedral angle between said root and pitch section.

5. An airfoil according to claim 4 wherein dihedral angle along said leading edge at said tip is greater than below said pitch section.

6. An airfoil according to claim 5 further comprising forward aerodynamic sweep at both said leading and trailing edges of said tip.

7. An airfoil according to claim 6 further comprising aft aerodynamic sweep from said root to said pitch section and to below said tip along said leading and trailing edges.

8. An airfoil according to claim 6 wherein said stagger varies along said leading edge to bow said leading edge concave in span along said suction side.

9. An airfoil according to claim 6 wherein said dihedral angle is unidirectional along said tip between said leading and trailing edges.

10. An airfoil according to claim 6 wherein said stagger has a maximum value located in a range of about 60%–85% span from said root.

11. A compressor airfoil comprising:
    laterally opposite pressure and suction sides joined together at chordally opposite leading and trailing edges and extending in span from a root to a tip; and
    stagger increasing above said root, and decreasing above a midspan pitch section of said airfoil.

12. An airfoil according to claim 11 wherein said stagger increases in magnitude from said root to said pitch section, and decreases in magnitude above said pitch section toward said root stagger magnitude.

13. An airfoil according to claim 12 further comprising a dihedral angle relative to a surrounding casing increasing above said pitch section to said tip.

14. An airfoil according to claim 13 wherein said dihedral angle above said pitch section is opposite to said dihedral angle between said root and pitch section.

15. An airfoil according to claim 14 wherein dihedral angle along said leading edge at said tip is greater than below said pitch section.

16. An airfoil according to claim 14 wherein said stagger varies along said leading edge to bow said leading edge concave in span along said suction side.

17. An airfoil according to claim 14 wherein said dihedral angle is unidirectional along said tip between said leading and trailing edges.

18. An airfoil according to claim 14 further comprising forward aerodynamic sweep at both said leading and trailing edges of said tip.

19. An airfoil according to claim 18 further comprising aft aerodynamic sweep from said root to said pitch section and to below said tip along said leading and trailing edges.

20. An airfoil according to claim 14 further comprising a concave axial projection along said leading edge, with said root and tip extending forward of said pitch section along said leading edge.

\* \* \* \* \*